(12) United States Patent
Down et al.

(10) Patent No.: US 7,342,331 B2
(45) Date of Patent: Mar. 11, 2008

(54) MULTI-PLANE FLEXIBLE ROTOR BALANCING

(75) Inventors: Edward M. Down, Tucson, AZ (US);
David E. Stout, Tucson, AZ (US);
Simon L. Waddell, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 83 days.

(21) Appl. No.: 11/259,542

(22) Filed: Oct. 25, 2005

(65) Prior Publication Data

US 2007/0090701 A1   Apr. 26, 2007

(51) Int. Cl.
*H02K 5/24* (2006.01)
*H02K 15/16* (2006.01)

(52) U.S. Cl. ................ 310/51; 310/214; 310/216; 310/261

(58) Field of Classification Search .......... 310/57, 310/61, 214, 216, 270, 51
See application file for complete search history.

(56) References Cited

U.S. PATENT DOCUMENTS

| | | | |
|---|---|---|---|
| 1,803,493 A | 5/1931 | Volet | |
| 4,644,201 A | 2/1987 | Tani et al. | |
| 4,920,634 A * | 5/1990 | Cole | 29/598 |
| 5,235,228 A | 8/1993 | Nakanura et al. | |
| 5,495,133 A | 2/1996 | Bawin et al. | |
| 5,621,588 A | 4/1997 | Williams et al. | |
| 5,892,306 A * | 4/1999 | Lloyd | 310/51 |
| 6,113,024 A * | 9/2000 | Pittard et al. | 242/433 |
| 6,226,857 B1 * | 5/2001 | Becherucci | 29/598 |
| 6,570,291 B1 | 5/2003 | Spaggiari | |
| 6,608,733 B2 | 8/2003 | Elsing | |
| 6,617,714 B2 * | 9/2003 | Laskaris | 310/54 |
| 6,661,133 B2 * | 12/2003 | Liebermann | 310/58 |
| 6,734,585 B2 * | 5/2004 | Tornquist et al. | 310/61 |
| 6,753,637 B2 * | 6/2004 | Tornquist et al. | 310/261 |
| 6,759,771 B2 * | 7/2004 | Doherty et al. | 310/58 |
| 6,791,230 B2 * | 9/2004 | Tornquist et al. | 310/214 |
| 6,794,773 B2 | 9/2004 | Jordan et al. | |
| 2003/0184180 A1 * | 10/2003 | Doherty et al. | 310/214 |
| 2003/0197444 A1 * | 10/2003 | Okamoto et al. | 310/261 |
| 2004/0140727 A1 * | 7/2004 | Tornquist et al. | 310/216 |

FOREIGN PATENT DOCUMENTS

JP   09084285 A  *  3/1997
JP   2004343919 A  *  12/2004

* cited by examiner

*Primary Examiner*—Darren Schuberg
*Assistant Examiner*—Dustin Jacobs
(74) *Attorney, Agent, or Firm*—Ingrassia Fisher & Lorenz

(57) ABSTRACT

A rotor balancing system is provided that includes a rotor core, a plurality of core channels, a support wedge, a wedge channel, and balance masses. The rotor core includes an annular section, a first pole, and a second pole. The first and second poles each extend radially outwardly from the annular section and form an interpole region therebetween. The plurality of core channels are formed in the rotor core annular section and extend axially through the rotor core annular section. The support wedge is disposed in the interpole region. The wedge channel is formed in the support wedge and extends therethrough. One or more balance masses are selectively disposed in one or more of the core channels and the wedge channel, and each balance mass is disposed at a predetermined axial location to thereby correct rotor imbalance.

19 Claims, 6 Drawing Sheets

MULTI-PLANE FLEXIBLE ROTOR BALANCING

TECHNICAL FIELD

The present invention relates to high speed generators and, more particularly, to a system for balancing high speed generators when the generator is rotating.

BACKGROUND

A generator system for a gas turbine engine, such as that found in aircraft, ships, and some terrestrial vehicles, may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a generator control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator, and this three-phase AC output can then be provided to a load such as, for example, an aircraft, ship, or vehicle electrical system.

Because some generator applications are high speed generators with potential rotational speeds up to and in excess of 24,000 rpm, potentially large centrifugal forces may be imposed upon the rotors in generators. Given these potentially stressful operating conditions, the rotors should be carefully designed and manufactured, so that the rotors are reliable and precisely balanced. Improper balancing not only can result in inefficiencies in the operation of a generator, but may also affect the reliability of the generator.

Rotor imbalance may be alleviated by using any one of several techniques. For example, the rotor may undergo a grinding process to remove material. However, typically, several attempts are needed to remove a sufficient amount of material from appropriate sections of the rotor. Additionally, debris from the grinding process may undesirably remain in the rotor and thereby cause the rotor to function improperly. In other examples, imbalance is corrected by adding material to the rotor. In most conventional rotor configurations, axial openings are formed through a portion of an outer periphery of a rotor armature and at each end of the rotor. One or more masses are then inserted into the axial openings. However, because the axial openings are only formed in the outer periphery and at the rotor ends, balance correction is limited to certain planes.

Hence, there is a need for a system and method for correcting imbalance in the rotors of a high speed generator by increasing the number of planes, throughout the length of the rotor, at which balance weights can be introduced. The present invention addresses one or more of these needs.

BRIEF SUMMARY

The present invention provides a rotor balancing system. In one embodiment, and by way of example only, the system includes a rotor core, a plurality of core channels, a support wedge, a wedge channel, and balance masses. The rotor core includes an annular section, a first pole, and a second pole. The first and second poles each extend radially outwardly from the annular section and form an interpole region therebetween. The plurality of core channels are formed in the rotor core annular section and extend axially through the rotor core annular section. The support wedge is disposed in the interpole region. The wedge channel is formed in the support wedge and extends therethrough. One or more balance masses are selectively disposed in one or more of the core channels and the wedge channel, and each balance mass is disposed at a predetermined axial location to thereby correct rotor imbalance.

In another embodiment, and by way of example only, a generator is provided that includes a shaft, a rotor core, a lower support wedge, an upper support wedge, channels, and balance masses. The shaft is configured to rotate about an axis. The rotor core is coupled to the shaft and includes an annular section, a first pole, and a second pole. The first and second poles each extend radially outwardly from the annular section and form an interpole region therebetween. The lower support wedge is disposed in the interpole region and has a side in contact with the rotor core. The upper support wedge is disposed in the interpole region over the lower support wedge and has a bottom wall, a top wall, and side walls therebetween. The plurality of channels are formed in and extend through the rotor core annular section, the lower support wedge, and the upper support wedge, and each channel is disposed at a different radial location relative to the axis. One or more balance masses are selectively disposed in one or more of the channels, each balance mass disposed at a predetermined axial location to thereby correct rotor imbalance.

In still another embodiment, and by way of example only, a generator having a stator and a rotor is provided. The rotor is rotationally mounted at least partially within the stator and includes a shaft, a rotor core, a lower support wedge, an upper support wedge, channels, and balance masses. The shaft is configured to rotate about an axis. The rotor core is coupled to the shaft and includes an annular section, a first pole, and a second pole. The first and second poles each extend radially outwardly from the annular section and form an interpole region therebetween. The lower support wedge is disposed in the interpole region and has a side in contact with the rotor core. The upper support wedge is disposed in the interpole region over the lower support wedge and has a bottom wall, a top wall, and side walls therebetween. The plurality of channels are formed in and extend through the rotor core annular section, the lower support wedge, and the upper support wedge, and each channel is disposed at a different radial location relative to the axis. One or more balance masses are selectively disposed in one or more of the channels, each balance mass disposed at a predetermined axial location to thereby correct rotor imbalance.

Other independent features and advantages of the preferred balancing system will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the present invention is not limited to use in conjunction with a specific type of electrical machine. Thus, although the present embodiment is, for convenience of explanation, depicted and described as being implemented in a brushless AC (alternating current) generator, it will be appreciated that it can be implemented in other generator designs needed in specific applications.

Figure 1:
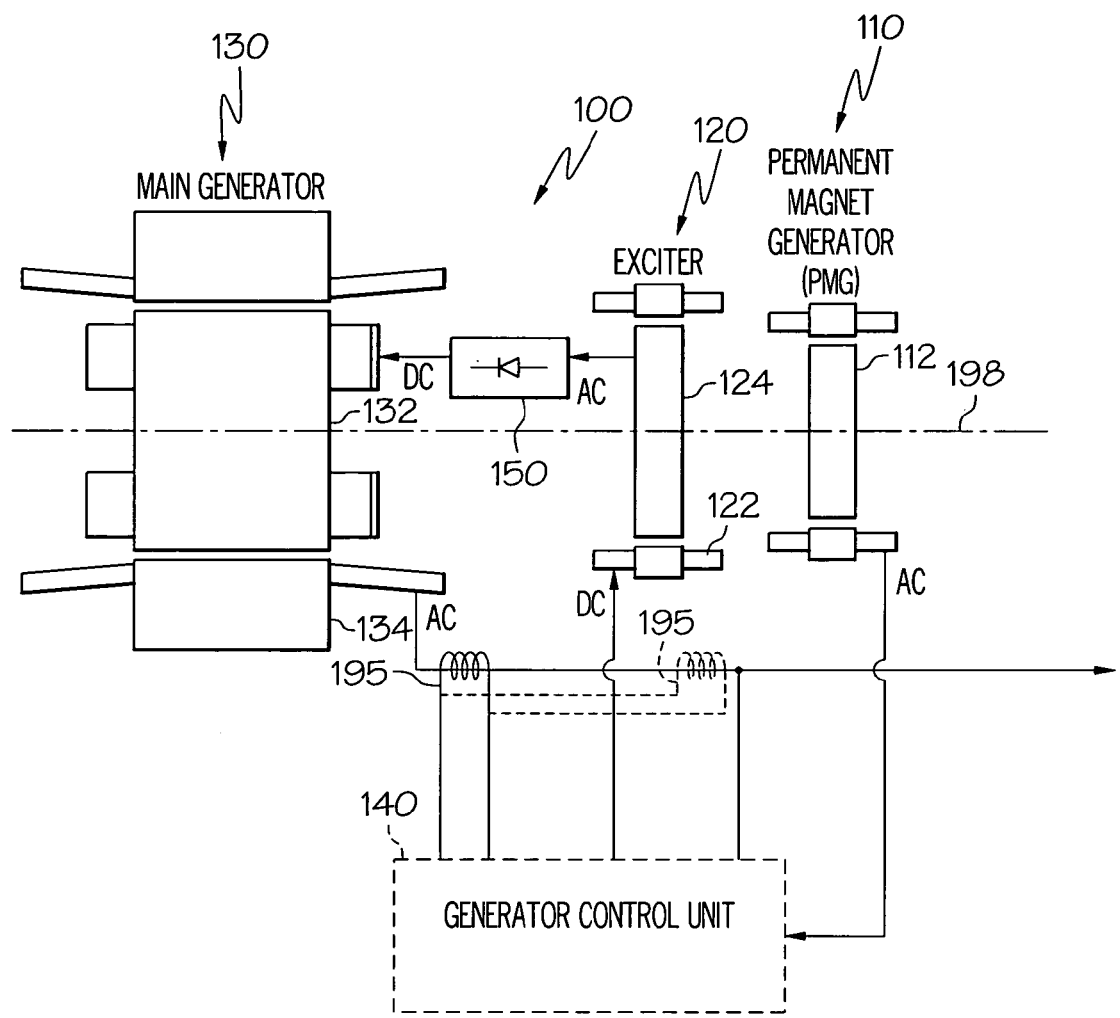
FIG. 1 is a functional schematic block diagram of an exemplary high speed generator system.

Turning now to the description, and with reference first to FIG. 1, a functional schematic block diagram of an exemplary high speed generator system 100 for use with a gas turbine engine such as that in an aircraft is depicted. This exemplary generator system 100, which is commonly known as a brushless AC generator, includes a permanent magnet generator (PMG) 110, an exciter 120, a main generator 130, a generator control unit 140, and one or more rectifier assemblies 150. During operation, a rotor 112 of the PMG 110, a rotor 124 of the exciter 120, and a rotor 132 of the main generator 130 all rotate. The rotational speed of these components may vary. In one embodiment, the rotational speed may be, for example, in the range of about 12,000 to about 24,000 r.p.m., or greater. As the PMG rotor 112 rotates, the PMG 110 generates and supplies AC power to the generator control unit 140, which in turn supplies direct current (DC) power to a stator 122 of the exciter 120. The exciter rotor 124 in turn supplies AC power to the rectifier assemblies 150. The output from the rectifier assemblies 150 is DC power and is supplied to the main generator rotor 132, which in turn outputs AC power from a main generator stator 134.

The generator system 100 is capable of providing output power at a variety of frequencies and over a variety of frequency ranges. Further, typically the output power from the main generator stator 134 is three-phase AC power. The generator control unit 140 can regulate the power output based upon monitoring signals provided to it from monitoring devices 195. In the depicted embodiment, the PMG rotor 112, the exciter rotor 124, and the main generator rotor 132 all rotate along a single axis 198 at the same rotational speed. It will be appreciated, however, that in other embodiments the PMG rotor 112 may rotate along a different axis. Moreover, the relative positioning of the PMG 110, the exciter 120, and the main generator 130 can be modified in different embodiments such that the main generator 130 is physically between the PMG 110 and the exciter 120.

Figure 2:
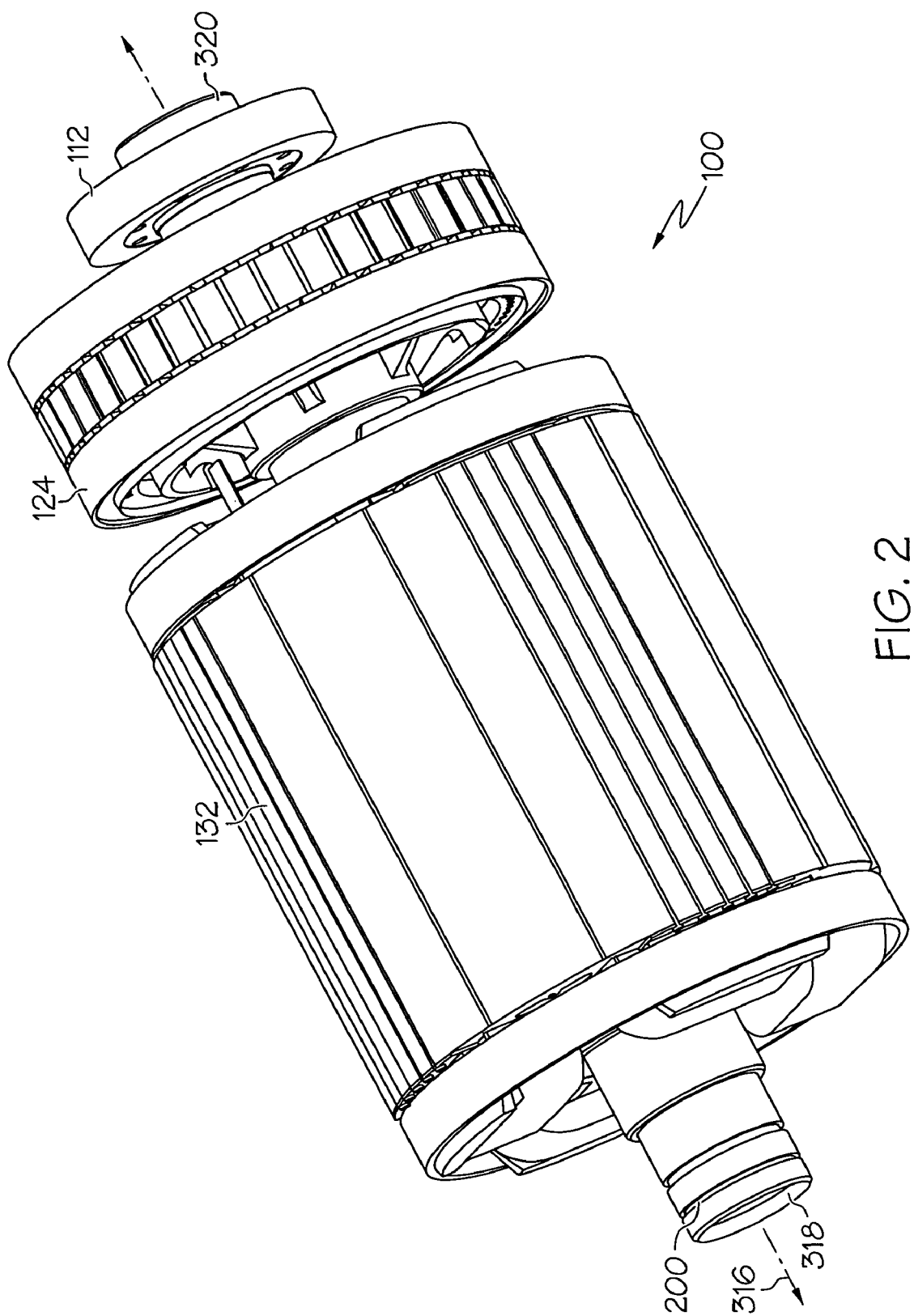
FIG. 2 is a perspective side view of a physical embodiment of a portion of the generator system depicted in FIG. 1.

A perspective view of an exemplary physical embodiment of some of the rotating components of the generator system 100 is provided in FIG. 2. It is noted that like reference numerals in FIG. 2 refer to like parts depicted in FIG. 1. As shown in the figure, the main generator rotor 132, the exciter rotor 124, and the PMG rotor 112 are coupled to a common shaft 200.

Figure 3:
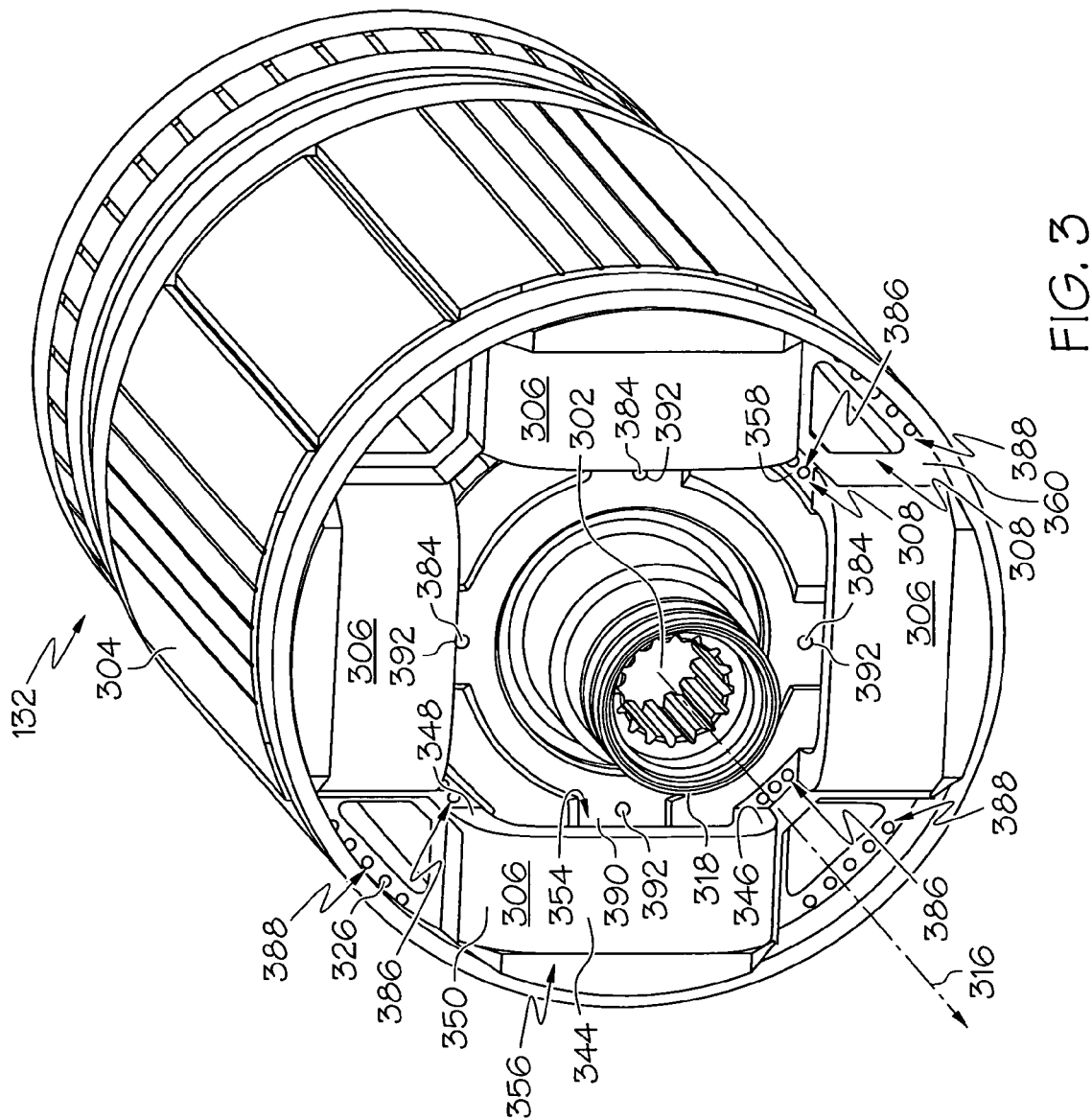
FIG. 3 is a perspective end view of a physical embodiment of the generator system depicted in FIG. 2.

An end view of the main generator rotor 132 is depicted in FIG. 3. The main generator rotor 132 includes a shaft assembly 302, a rotor core 304, a plurality of coils 306, coil support assemblies 308, and a balance correction system disposed therein. The shaft assembly 302 extends axially through the main generator rotor 132 along an axis 316, and, as shown in FIGS. 2 and 3, includes a first end 318 and a second end 320. The first end 318 is adapted to be coupled to a non-illustrated prime mover, which could be the aforementioned gas turbine engine, and thus may be referred to as the "drive end," while the second end 320 may be referred to as the "anti-drive end." The shaft assembly 302 is substantially hollow along most of its length, and includes an opening (not illustrated) in one end and is preferably closed at the other end. In the depicted embodiment, the anti-drive end 320 is open and the drive end 318 is closed. A cooling fluid, such as oil, is supplied to the generator and is directed into the opening in the anti-drive end 320 of the shaft assembly 302.

Figure 4:
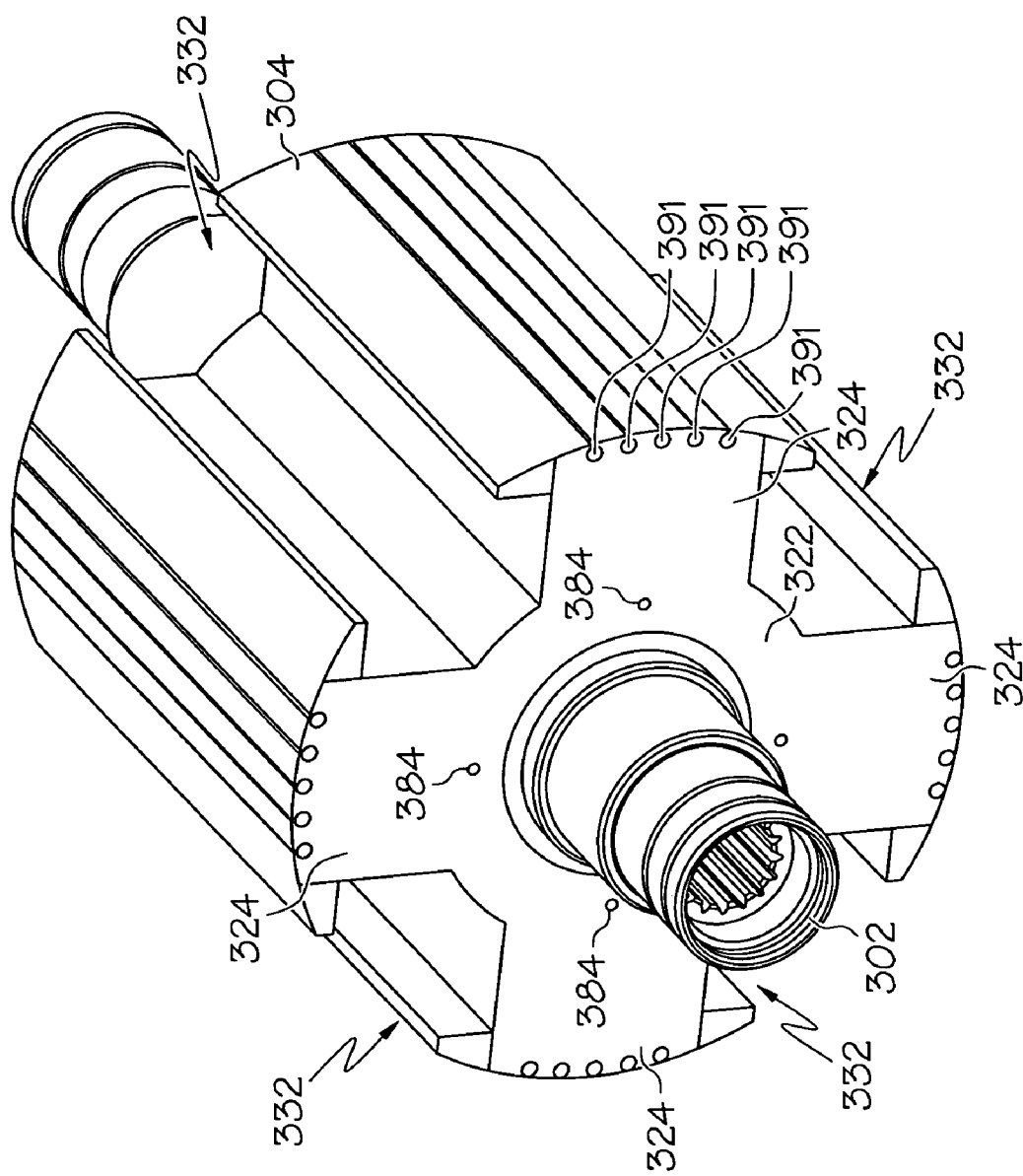
FIG. 4 is a perspective end view of an exemplary rotor core that may be implemented into the generator system depicted in FIG. 2.

The rotor core 304, shown in more detail in FIG. 4, is disposed around the shaft assembly 302 and includes an annular section 322 and a plurality of poles 324. The annular section 322 is mounted directly onto the shaft assembly 302 and includes the plurality of poles 324 which extend radially outwardly therefrom. The poles 324 are generally spaced evenly apart from one another, forming interpole regions 332 between adjacent poles 324 and exposing portions of the annular section 322 outer periphery. It will be appreciated that the annular section 322 and poles 324 are typically formed of non-illustrated laminations and interlamination disks, both of which are shrunk fit, or otherwise mounted, onto the shaft assembly 302. Although the main generator rotor 132 depicted in FIGS. 3 and 4 is a four-pole rotor, it will be appreciated that the present invention may be used with rotors having other numbers of poles.

Figure 5:
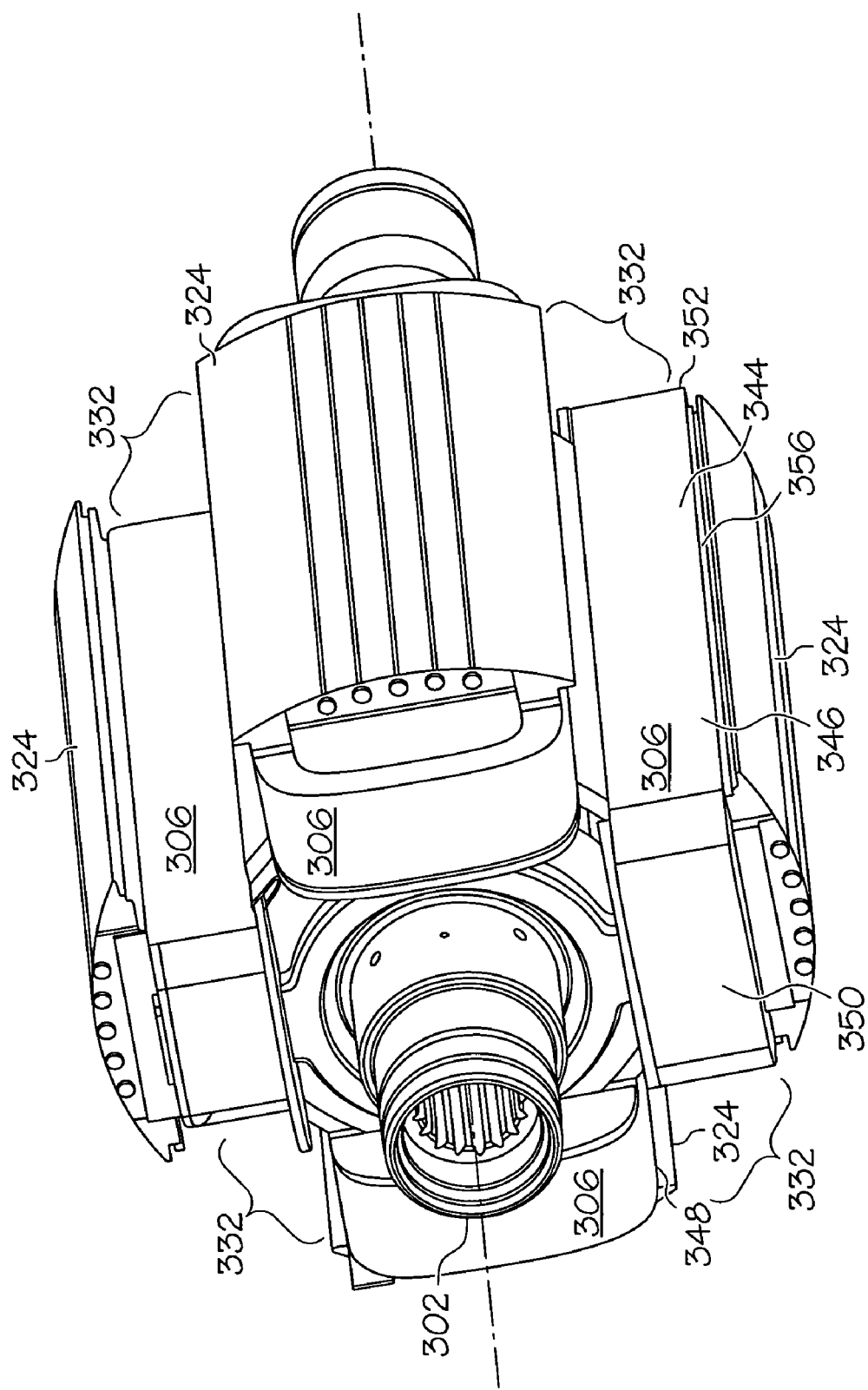
FIG. 5 is a perspective end view of an exemplary rotor core including windings that may be implemented into the generator system depicted in FIG. 2.

With reference to both FIGS. 3 and 5, the coils 306 are wrapped, one each, around a respective pole 324, and are preferably formed by wrapping numerous individual wire windings around the respective poles 324. Each coil 306 includes an outer surface 344 around the outer perimeter of the coil that is formed from the outermost layer of wire windings of the coil 306. The outer surface 344 includes two sides 346, 348 and two end turns 350, 352. The outer surface sides 344 are made up of wire segments that are wrapped across the sides of the pole 324 and that predominantly follow directions parallel to the axis 316. In contrast, the end turns 350, 352 are made up of wire segments that loop around the ends of the pole 324 and that follow paths that are predominantly within planes that are perpendicular to the axis 316. The coil 306 also includes an inward-facing edge 354, which faces the shaft 302, and an outward-facing edge 356, which faces away from the shaft 302. It is noted that the coils 304 may be formed of any one of numerous conductors, but in a preferred embodiment are formed from copper.

Figure 6:
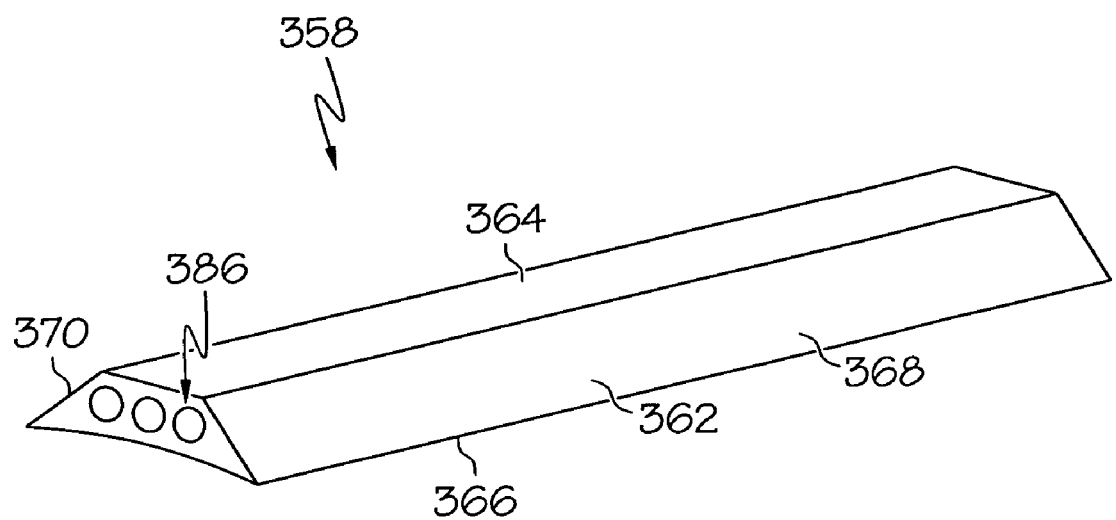
FIG. 6 is a perspective view of an exemplary lower support wedge that may be implemented into the generator system depicted in FIG. 2.

As was noted above, many high speed generators include coil support assemblies 308. Thus, as is also shown in FIG. 3, coil support assemblies 308 are positioned within each of the interpole regions 332, and provide lateral and radial support for the coils 306. Each coil support assembly 308 includes a lower support wedge 358 and an upper support wedge 360. The lower support wedges 358, one of which is shown in more detail in FIG. 6, each include a main body 362 that is substantially trapezoidal in shape, and that includes top and bottom surfaces 364 and 366, respectively, and first and second opposed side surfaces 368 and 370, respectively. The lower support wedges 358 are each disposed in one of the interpole regions 332 (shown in FIG. 3), such that the side surfaces 368, 370 contact the inward-facing edges 354 of the coils 306. Although not shown, the main body 362 may additionally include one or more openings that extend between the top and bottom surfaces 364, 366.

Figure 7:
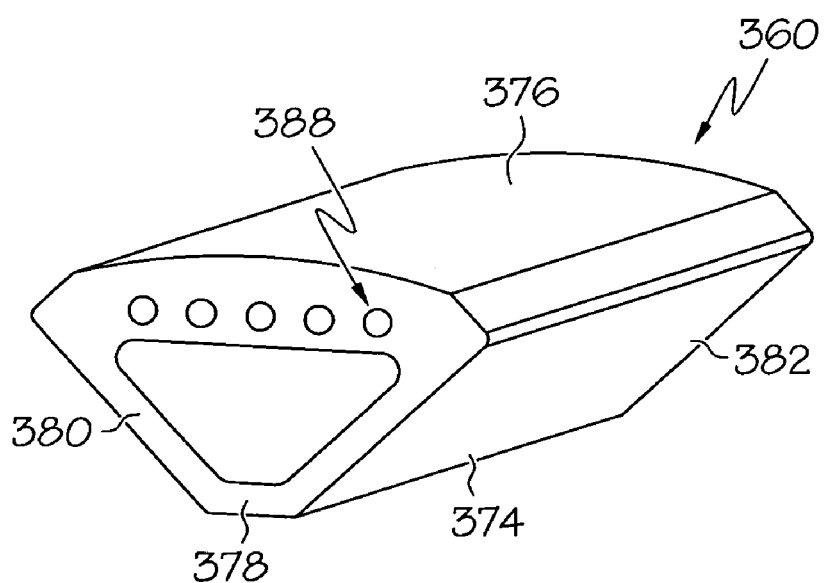
FIG. 7 is a perspective view of an exemplary upper support wedge that may be implemented into the generator system depicted in FIG. 2.

The upper support wedges 360, one of which is shown in more detail in FIG. 7, each include a longitudinally extending main body 374, and similar to the lower support wedge 358, is substantially trapezoidal in shape. The main body 374 includes a top and bottom walls 376, 378 and first and second opposed side walls 380, 382. As with the lower support wedges 358, the upper support wedges 360 are each disposed in the interpole regions 332 (shown in FIG. 3); however, the upper support wedges 360 are configured such that the upper support side walls 380, 382 contact the sides 346, 348 of the coils 306.

Returning to FIG. 3, the main generator rotor 132 is further configured to provide multi-plane balancing. In particular, a plurality of axial channels 384, 386, 388 are formed in multiple rotor components at various angular positions around the shaft assembly 302 relative to the axis 316. Each of these openings 384, 386, 388 is configured to receive one or more balance masses 326, which may be used to correct rotor imbalance. The axial channels 384, 386, 388 each extend the length of the component in which they are formed and may have smooth or threaded walls. The axial channels 384, 386, 388 may additionally have a circular, square, rectangular, or any other shape cross section. It will be appreciated, however, that the particular configuration of the channel walls may depend on the configuration of the balance masses 326 that will be used to correct the rotor imbalance, or vice-versa. In this regard, the balance masses 326 may additionally have any one of numerous cross-sectional shapes, any length, or any patterned surface.

Preferably, the axial channels 384, 386, 388 are formed in sections of the rotor 132 from which material may be added and removed without adversely impacting the rotor electromagnetic characteristics. In this regard, the axial channels 384, 386, 388 are most preferably formed in the rotor core 304 and support wedges 358, 360 respectively. Turning back to FIG. 4, the axial rotor channels 384 are most preferably formed in the rotor annular section 322. It will be appreciated that the particular positioning of the axial rotor channels 384 may be dependent on the configuration of the particular rotor 132, however, the axial rotor channels 384 are preferably formed such that they are disposed adjacent to the shaft assembly 302 when the generator 100 is in an assembled state. Additionally, although four axial rotor channels 384 are shown in FIG. 3, each aligned with the poles 306, more or fewer channels 384 may be formed in any one of numerous other radial positions around the rotor annular section 322. It will be appreciated that the rotor core 304 may additionally include a plurality of channels 391 formed in the outer periphery of each pole 324, also illustrated in FIG. 4.

As briefly mentioned above and as shown in FIGS. 6 and 7, the support wedges 358, 360 also include one or more axial channels 386, 388. The axial wedge channels 386 of the lower support wedge 358 are formed preferably along the entire length thereof and in any portion thereof. It will be appreciated that although three lower support wedge channels 386 are depicted, more or fewer may alternatively be incorporated. The axial wedge channels 388 of the upper support wedge 360 are also formed along the entire length thereof. Preferably, the upper support wedge channels 388 are formed in the top wall 376 of the upper support wedge 360. However, the channels 388 may alternatively, or additionally, be formed in the bottom wall 378. In some exemplary embodiments, the axial wedge channels 386, 388 are formed such that when the rotor 132 is assembled, the channels 386, 388 are disposed in a staggered pattern and at different angular locations relative to one another.

Returning to FIG. 3, in some cases, an insulation lamination disk 390 may be provided proximate the ends 318, 320 of the shaft assembly 302. To provide access to the channels 384, 386, 388, a plurality of holes 392 are formed through the disk 390. The number of holes 392 in each disk 390 may vary, but preferably each disk 390 includes an appropriate number of holes 392 that correspond with the number of axial channels 384, 386, 388 in the rotor 132. Moreover, the holes 392 in each disk 390 are collocated, if necessary, with the channels 384, 386, 388. Similar to the axial channels 384, 386, 388, each of the disk holes 392 may have smooth or threaded walls and may additionally have a circular, square, rectangular, or any other shape cross section. It will be appreciated, however, that the particular configuration of the disk hole walls may depend on the configuration of the balance masses 326 that will be used to correct the rotor imbalance, or vice-versa.

When the rotor 132 experiences imbalance, one or more balance masses 326 are selectively disposed in one or more of the axial channels 384, 386, 388. Each of the masses 326 may be disposed in different axial locations in the channels 384, 386, 388. The masses 326 are inserted or removed until the rotor imbalance is corrected.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A rotor system, comprising:
  a rotor core configured to rotate about an axis, the rotor core including an annular section, a first pole, and a second pole, the first and second poles each extending radially outwardly from the annular section and forming an interpole region therebetween;
  a support wedge disposed in the interpole region; and
  a multi-plane balancing system comprising:
    a plurality of core channels formed in the rotor core annular section at a first radial location relative to the axis and extending axially through the rotor core annular section;
    a wedge channel formed in the support wedge and extending therethrough, the wedge channel disposed at a second radial location that is different than the first radial location; and
    one or more balance masses selectively disposed in one or more of the core channels and the wedge channel at one of the first radial location or the second radial location, each balance mass disposed at a predetermined axial location to thereby correct rotor imbalance.

2. The system of claim 1, wherein the plurality of core channels is formed in the rotor core annular section proximate the shaft.

3. The system of claim 1, wherein the support wedge is a trapezoidally shaped rod that includes a bottom surface that contacts the rotor core annular section.

4. The system of claim 1, wherein the support wedge is a lower support wedge and the system further comprises an upper support wedge disposed in the interpole region over the lower support wedge.

5. The system of claim 4, wherein the upper support wedge includes a bottom wall, a top wall, and side walls extending therebetween.

6. The system of claim 5, further comprising a plurality of upper wedge channels extending through the upper support wedge top wall.

7. The system of claim 5, wherein at least one of the core channel and the wedge channels has threaded walls.

8. A generator rotor, comprising:
a shaft configured to rotate about an axis;
a rotor core coupled to the shaft and including an annular section, a first pole, and a second pole, the first and second poles each extending radially outwardly from the annular section and forming an interpole region therebetween;
a lower support wedge disposed in the interpole region and having a side in contact with the rotor core;
a upper support wedge disposed in the interpole region over the lower support wedge having a bottom wall, a top wall, and side walls therebetween; and
a multi-plane balancing system including:
a plurality of channels formed in and extending through the rotor core annular section, the lower support wedge, and the upper support wedge, each channel disposed at a different radial location relative to the axis; and
one or more balance masses selectively disposed in one or more of the channels at one of the different radial locations, each balance mass disposed at a predetermined axial location to thereby correct rotor imbalance.

9. The generator rotor of claim 8, wherein at least one of the channels is formed in the upper support wedge top wall.

10. The generator rotor of claim 8, wherein at least one of the channels is formed in the rotor core annular section proximate the shaft.

11. The generator rotor of claim 8, wherein the at least one of the channels extends axially through one of the rotor core first and second poles.

12. The generator rotor of claim 8, wherein plurality of channels are substantially parallel to the axis.

13. The generator rotor of claim 8, wherein at least one of the channels has threaded walls.

14. A generator, comprising:
a stator;
a rotor rotationally mounted at least partially within the stator, the rotor including:
a shaft configured to rotate about an axis;
a rotor core coupled to the shaft and including an annular section, a first pole, and a second pole, the first and second poles each extending radially outwardly and forming an interpole region therebetween;
a lower support wedge disposed in the interpole region and having a side in contact with the rotor core;
a upper support wedge disposed in the interpole region over the lower support wedge having a bottom wall, a top wall, and side walls therebetween; and
a multi-plane balancing system comprising:
a plurality of channels formed in the rotor core annular section, the lower support wedge, and the upper support wedge, each channel disposed at a different radial location relative to the axis; and
one or more balance masses selectively disposed in one or more of the channels at one of the different radial locations, each balance mass disposed at a predetermined axial location to thereby correct rotor imbalance.

15. The generator of claim 14, further comprising a first and a second coil disposed around the first and the second poles, respectively.

16. The generator of claim 14, further comprising an axial pole channel formed in one of the first and the second poles.

17. The generator of claim 14, wherein at least one of the channels is formed in the upper support wedge top wall.

18. The generator of claim 14, wherein at least one of the channels is formed in the rotor core annular section proximate the shaft.

19. The generator of claim 14, wherein the plurality of channels are substantially parallel to the axis.

* * * * *